(12) United States Patent
Bruno et al.

(10) Patent No.: US 6,525,780 B1
(45) Date of Patent: Feb. 25, 2003

(54) "MIDLINK" VIRTUAL INSERTION SYSTEM

(75) Inventors: Pierre Bruno, Paris (FR); Gerard Guy Medioni, Los Angeles, CA (US); Jean Jacques Grimaud, Portola Valley, CA (US)

(73) Assignee: Symah Vision, SA, Vanves Cedex (FR)

( * ) Notice: Subject to any disclaimer, the term of this patent is extended or adjusted under 35 U.S.C. 154(b) by 0 days.

(21) Appl. No.: 09/215,274

(22) Filed: Dec. 18, 1998

(51) Int. Cl.[7] .............................................. H04N 52/262
(52) U.S. Cl. ........................ 348/578; 348/598; 348/589; 348/600; 348/159; 348/722
(58) Field of Search ................................. 348/598, 578, 348/589, 600, 153, 159, 584, 722; 386/107; H04N 5/262

(56) References Cited

U.S. PATENT DOCUMENTS

| | | | |
|---|---|---|---|
| 4,393,394 A | * 7/1983 | McCoy | 352/22 |
| 4,791,489 A | * 12/1988 | Polatnick | 358/160 |
| 5,264,933 A | 11/1993 | Rosser et al. | |
| 5,363,392 A | 11/1994 | Kazukawa et al. | |
| 5,436,672 A | 7/1995 | Medioni et al. | |
| 5,491,517 A | * 2/1996 | Kreitman et al. | 348/581 |
| 5,543,856 A | 8/1996 | Rosser et al. | |
| 6,208,386 B1 | * 3/2001 | Wilf et al. | 348/578 |

FOREIGN PATENT DOCUMENTS

| | | |
|---|---|---|
| FR | 94 05895 | 5/1994 |
| FR | 2 730 837 | 8/1996 |
| WO | WO 95/12282 | 5/1995 |
| WO | WO 97/02699 | 1/1997 |
| WO | WO 98/24242 | 6/1998 |

* cited by examiner

*Primary Examiner*—John Miller
*Assistant Examiner*—Jean W. Désir
(74) *Attorney, Agent, or Firm*—Larson & Taylor, PLC

(57) ABSTRACT

A television system is provided wherein a target region in successive video images is replaced by a matching pattern adapted to be inserted into the target region, using a virtual insertion unit located downstream of the originating site. The system includes television cameras for, when active, producing a sequence of video images of a scene, and a switcher or multiplexer for switching between camera images. A broadcast image processor located with the multiplexer in an outside broadcast van receives the video images and adds layers of graphics and special effects to the video images to produce a broadcast feed. The virtual insertion unit, which is located off-site from the van, receives the broadcast feed and modifies the video images of the broadcast feed by replacing the target region of these images with a replacement pattern adapted to be inserted into the target region.

18 Claims, 7 Drawing Sheets

"MIDLINK" VIRTUAL INSERTION SYSTEM

FIELD OF THE INVENTION

The present invention relates to virtual insertion systems for television video and, more particularly, to a "midlink" system which enables the virtual insertion system to be positioned downstream of the originating site in the chain of distribution of a television program.

BACKGROUND OF THE INVENTION

The term virtual insertion system is used herein to describe systems which replace, or insert in place of, in a video sequence of a scene (i.e., as obtained by a video camera or recorder), a target region or area in the video image by a matched replacement pattern adapted to be inserted into the target region, such as representation of a model stored in memory. For example, the video sequence may be of a soccer match or a stock car race wherein commercial billboards are part of the scene. The virtual insertion process involves replacement of the "target," i.e., a particular billboard advertising a first product, in the scene with a representation of a different billboard advertising a second product so that in using existing techniques, this way a different commercial product is advertised in the scene. This can be done in such a way that the substituted portion fits substantially seamlessly into the basic image so as not to be noticeable to a viewer as a replacement or substitute.

Briefly considering existing virtual insertion systems, a representation of the target, i.e., the selected part of the scene intended for replacement or addition, is memorized, i.e., stored in memory. The position, size and perspective of the target are computed. The stored pattern is then transformed geometrically according to the estimated size and perspective of the corresponding target in the current scene image. The pattern representation is also modified in accordance with the radiographic properties of the target. Finally, the transformed pattern is inserted into the current scene image to replace the target. It will be understood that the transformed pattern need not be a sample image but can instead be a two-dimensional or three-dimensional graphic element (which may or may not be animated) Systems of this general type are disclosed, for example, in U.S. Pat. No. 5,264,933 (Rosser), U.S. Pat. No. 5,363,392 (Luquet et al), U.S. Pat. No. 5,436,672 (Medioni et al) and U.S. Pat. No. 5,543,856 (Rosser) as well as French Patent No. 94-05895 to which patents reference is made for a more complete description of the virtual insertion process and the subject matter of which patents is hereby incorporated by reference.

There are two basic types of virtual insertion systems, instrumented camera systems and image recognition systems. The process used to obtain an estimation of the position, size and perspective of a target depends on whether the camera is instrumented or not. In an instrumented system, sensors are used to measure the camera operating parameters such as pan, tilt, focus and zoom, and the location, size and perspective of the target are determined from the sensor outputs. If the cameras are not instrumented and thus information from sensors is not available, an image recognition system is used to detect and track the relevant area or areas of the current scene images in order to obtain the required parameters and the area or areas are replaced in real time.

Referring to FIG. 1, the typical chain of distribution of a television program is indicated in a schematic manner. A plurality of cameras 10 are focussed on a scene S and transmit what is referred to as a "clean clean" feed, i.e., a feed without graphics or special effects, to a mobile control room or van ("truck") 12 which is generally located at the venue. Control room 12, which is generally located at the venue, i.e., at the site of the event, selects the image that will be broadcast, using a multiplexer or switcher unit. The multiplexer unit also generates a coded signal, referred to as a "tally" signal or "tally," to identify the specific camera being used to produce that particular image. For economic and aesthetic reasons, only certain broadcast cameras are instrumented with sensors and the tally closure of the cameras reflects which camera is active or on air at any given time. Signals can also be generated which reflect whether a given graphic layer or special effect is in use at any given time. In the terminology generally used, a "clean-clean feed" contains only the camera signals whereas a "clean feed" contains one graphic layer and/or special effect (e.g., a slow motion replay). Using standard video equipment, the control room can add graphic layers and/or special effects to produce the final image. A so-called "dirty feed," i.e., a feed containing the camera image plus all of the graphic layers, special effects, etc, is then sent to the network studio 16 via a satellite indicated at 14. The principal role of the network studio is to broadcast the images, via a satellite 17, to daughter stations 18 and these stations, in turn, broadcast the images to the public, as indicated by individual television receivers 19.

In some present commercial systems, cameras are used in a switched mode wherein image processing is carried out "before" the multiplexer or switcher. For example, with these prior art systems, the director in the mobile control room has two signals from camera A from which to choose, signal A and signal A' wherein signal A' is a signal from camera A which has been previously processed at the venue and which is thus delayed with respect to signal A.

There are a number of different approaches in providing virtual insertion that have been used, or are potentially useable with respect to the location at which virtual insertion takes place. A first approach, which will be referred to as an uplink monocamera system and which is illustrated in FIG. 2, concerns a system or configuration wherein the virtual insertion system is located on-site, i.e., wherein the video images (and the sensor data, if applicable,) are processed locally at the venue, i.e., are sent to the mobile control room or outside broadcaster van of the broadcaster located at the venue and processed there. This is the approach typically used in some commercial virtual insertion systems.

In FIG. 2, cameras 10a, 10b, 10c are connected to a multiplexer 31 and an image processing system 21 is located between the cameras and the multiplexer 31. It will be understood that FIG. 2 is intended to cover, the generic case, i.e., both instrumented and uninstrumented cameras, and that for instrumented cameras, both an image signal and a sensor output signal would be provided for each camera. Further, although only a single image processing system is shown, typically there would be an imaging processor for each camera. A virtual insertion device or unit 22 of the type described above replaces the relevant part, i.e., the target region, of the video image with the desired advertising pattern or the like. Again, in the commercial implementation, a separate virtual insertion unit 22 is individually associated with each camera, regardless of whether the camera is on air or not, in order to produce a different feed for use in the rest of the chain. The virtual insertion units 22 obviously must be on-site and must also be attached to each camera, where more than one camera is to be used. As mentioned above, the director in the control has the choice of two duplicate images, a "clean clean" image directly from the camera and a delayed image from the camera after processing by the image processing system 21 and the virtual insertion unit 22, and the multiplexer 31 can be used to switch between the two. The multiplexer 31 is located in a mobile control room or van 30 along with standard video equipment indicated at 32. The video equipment 32 is used to add graphic layers, special effects and non-camera generated effects such as camera replay to the output images from the multiplexer 31. The images are sent to the network studio 40 and, from there, are relayed to daughter station(s) 50. Among the disadvantages of this approach are that one virtual insertion or replacement system is necessary for each camera and the virtual insertion operation must be performed on-site which requires that a relatively large number of technical people be on-site.

Referring to FIG. 3, wherein elements corresponding to those shown in FIG. 2 have been given the same reference numerals, what will be referred to as an uplink multicamera configuration is shown. In this configuration, which has been used commercially by the assignee of the present application since 1995, the virtual insertion device 22 is located in a van (e.g. an EPSIS™ truck), on-site, and accepts inputs from multiple cameras (e.g. cameras 10a, 10b and 10c) and processes the "clean feed" of the active active, as identified by the tally signal from the mobile control room 30. In one embodiment, represented schematically in FIG. 3, a pattern recognition module of the image processing system 21 is used to determine the target area to be replaced and while, in alternative embodiments, instrumented cameras are used, and data signals from camera sensors, i.e., pan, tilt, zoom and focus signals, are sent directly from the cameras 10a, 10b and 10c to the virtual insertion device 22. The modified video stream produced by virtual insertion device or system 22 is then sent back to the mobile control room or van 30 and the video equipment 32 inserts graphic layers and special effects or, alternatively, the virtual insertion device uses graphics layers and special effects from the control room 30 to generate a new "dirty feed" to the network station or studio 40.

Referring to FIG. 4, a system which will be referred to as an uplink/downlink system is shown. Again, corresponding units have been given the same reference numerals as in FIG. 2. In this system, the processing required for virtual insertion is split into two parts. If image processing is to be performed, it is carried out on-site as indicated by image processing unit 21. All of the other required steps are performed at the mobile control room or van 30 except for the actual insertion. All of the information necessary to perform the insertion step (e.g., target location, occluded pixels, etc.) is encoded at the mobile control room 30 and is transmitted to the network studio 40. The virtual insertion is performed at the studio 40 or downstream thereof as indicated by the location of insertion system 22. At the daughter station(s) 50, the insertion pattern can be different for each of the daughter stations, if desired. A system of this type is disclosed in French Patent No. 94-05895, referred to above. Methods for protecting the encoded information are described in one of the above-mentioned Rosser patents (U.S. Pat. No. 5,543,856) along with a "master" —"slave" system wherein the master system does the image recognition and detection and provides information pertaining to the precise location of the inserted image and the slave system carries out the insertion operation.

SUMMARY OF THE INVENTION

In accordance with the invention, a "midlink" system is provided wherein the required input and control data is collected at the venue, i.e., on-site and transported to an off-site location at which virtual insertion is performed on the "dirty feed" broadcast from the venue.

In accordance with one aspect of the invention a television system is provided wherein a target region in successive video images is replaced by a matching pattern adapted to be inserted into the target region, the system comprising:

at least one television camera for producing a sequence of video images of a scene;

image broadcast processing means for receiving the video images and for selectively adding layers of graphics and special effects to the video images to produce a broadcast feed; and virtual insertion means, located off-site from the broadcast image processing means, for receiving the broadcast feed and for modifying the broadcast feed by replacing a target portion of the video images with a replacement pattern adapted to be inserted into the target portion.

According to a further aspect of the invention, a television system is provided wherein a target region in successive video images is replaced by a matching representation pattern adapted to be inserted into the target region, the system comprising:

at least one television camera for producing a sequence of video images of a scene;

a mobile control room located on-site with said at least one camera and including broadcast image processing means for receiving said video images and for adding layers of graphics and special effects to said video images to produce corresponding video images and means for outputting the corresponding video images in digital form as a broadcast feed; and virtual insertion means, located off-site from said at least camera and said mobile control room, for receiving said broadcast feed and for modifying the video images thereof by replacing a target portion of said processed images with a replacement pattern adapted to be inserted into the target portion.

Preferably, the system includes a plurality of cameras which are adapted to be active and means for determining which one of the plurality of cameras is presently active and for producing a corresponding output, and the virtual insertion means replaces a target portion of a video image from the active camera based on said output.

Advantageously, router means are provided which are housed separately from said mobile control room and which, during calibration of the system, receive the broadcast feed and individual direct feeds from each of said cameras and selectively output one of said feeds. The router means is used to facilitate the selection of a target or targets during a calibration process for each camera prior to broadcast wherein, e.g., keyed levels are adjusted.

In the embodiment wherein the system includes a plurality of cameras, there are preferably provided means for generating camera closure signals for indicating which of said plurality of cameras is active, and means for monitoring said camera closure signals to determine if a camera closure signal has been received for the camera whose video image is currently being received by the virtual insertion means.

Preferably, the system further comprises monitoring means for monitoring the graphics and special effects added to produce the video images of the broadcast feed and for producing an output indicating that a video image received by said virtual insertion means should not be modified thereby based on the nature of the graphics and special effects that have been added to the received video image. In one preferred implementation, the monitoring means produces said output when any of the added special effects is incompatible with the replacement pattern. In a further preferred implementation, the monitoring means produces said output when any special effect has been added to the received image to be processed. Advantageously, the monitoring means produces said output when any layer of the added graphics is inconsistent with the replacement pattern.

In a preferred embodiment, the at least one camera comprises a plurality of instrumented cameras each including sensor means associated therewith for producing operational data with respect to corresponding camera, and the system further comprises means for sending said operational data to said virtual insertion means for use in replacing the target portion of a video image of the broadcast feed with a replacement pattern consistent with the operational data. Advantageously, the operational data includes camera pan, tilt, focus and zoom.

In accordance with yet another aspect of the invention, a television system is provided wherein a target region in successive video images is replaced by a matching representation pattern adapted to be inserted into said target region, the system comprising:

a plurality of television cameras for, when active, producing a sequence of video images of a scene;

sensor means for each of said cameras for sensing a plurality of operational parameters associated with the corresponding camera and for producing a respective data output;

a mobile control room located on-site with said cameras and including image processing means for receiving said video images and for adding layers of graphics and special effects to said video images to produce resultant video images, and means for outputting the resultant video images in digital form as a broadcast feed;

local control means located on-site with said mobile control room for receiving the data outputs of said sensor means and for outputting a data signal; and virtual insertion means, located off-site from the cameras, control room and local control means, for receiving the broadcast feed and the data signal and for modifying the video images of the broadcast feed by replacing a target portion of said video images with a replacement pattern adapted to be inserted into the target portion.

Preferably, the local control means further comprises means for determining which one of said plurality of cameras is presently active and for producing a corresponding output and the virtual insertion means receives a control signal based on that output and responsive thereto, replaces the target portion of a video image of the broadcast feed from the camera indicated to be active.

Advantageously, the local control means further comprises router means for, during calibration of the system, receiving said broadcast feed and individual direct feeds from each of said plurality of cameras and for selectively outputting one of said feeds.

In a preferred implementation, the mobile control room includes means for generating camera closure signals for indicating which of said plurality of cameras is active and the local control means includes logic control means for monitoring said camera closure signals to determine if a camera closure signal has been received for the camera whose video image is currently being received by virtual insertion means and for sending a corresponding control signal to said virtual insertion means. Advantageously, the logic control means produces an output indicating that the second in time of two cameras is active when closure signals for a first in time camera and the second in time camera are received at the same time.

The local control means preferably further comprises logic control means for monitoring the graphics and special effects added to produce the video images of the broadcast feed and for producing an output indicating that a video image received by said virtual insertion means should not be modified thereby based on the nature of the graphics and special effects that have been added to the received processed image. As discussed above, in one embodiment, the logic control means produces said output when any of the added graphics or special effects is incompatible with the replacement pattern. Preferably, the logic means produces said output when any special effect has been added to the received video image to be processed or when any layer of the added graphics is incompatible with the replacement pattern.

Further features and advantages of the present invention will be set forth in, or apparent from, the detailed description of preferred embodiments thereof which follows.

DESCRIPTION OF THE PREFERRED EMBODIMENTS

Figure 2:
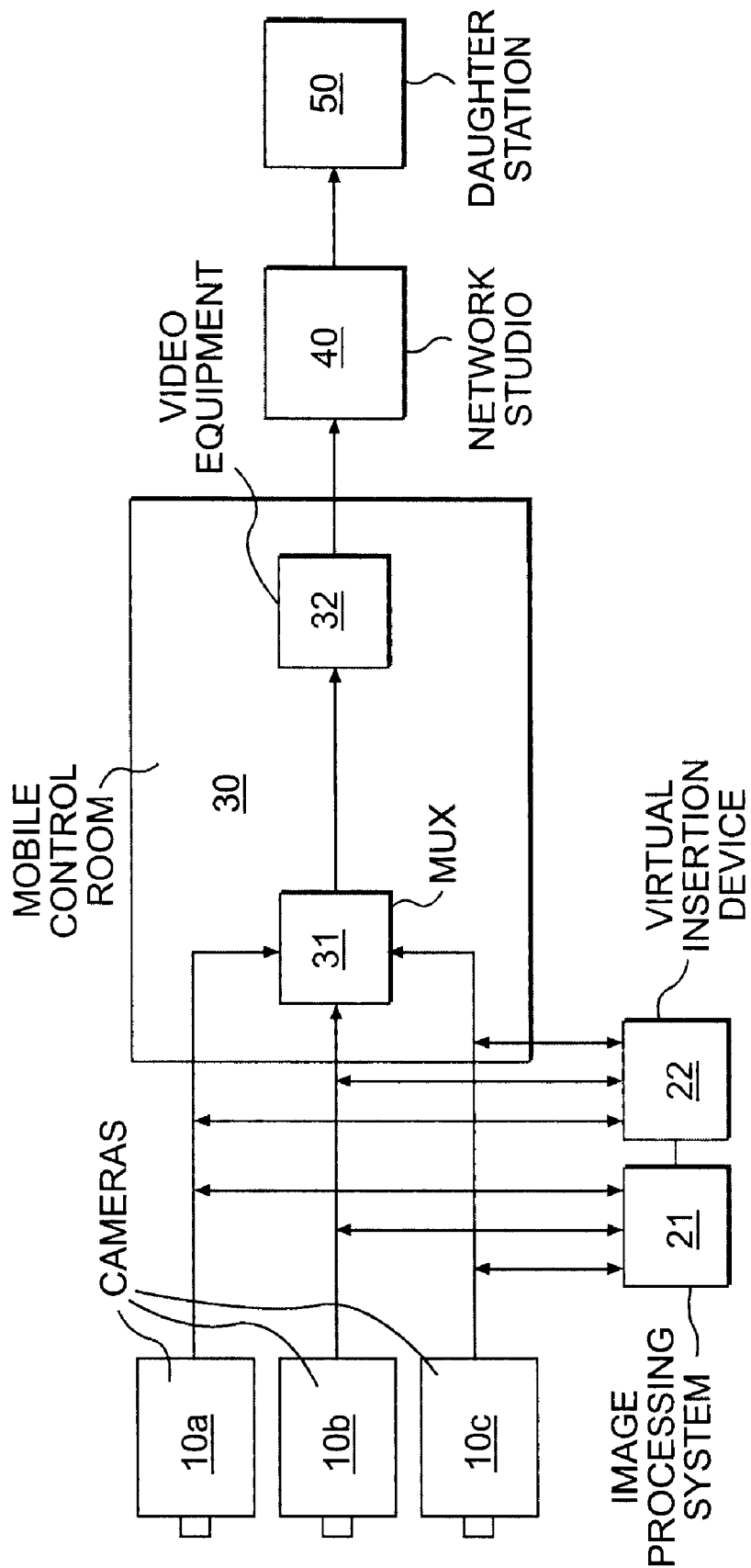
FIGS. 2, 3 and 4, which were also described above, are block diagram representations of prior art virtual insertion systems.
Figure 3:
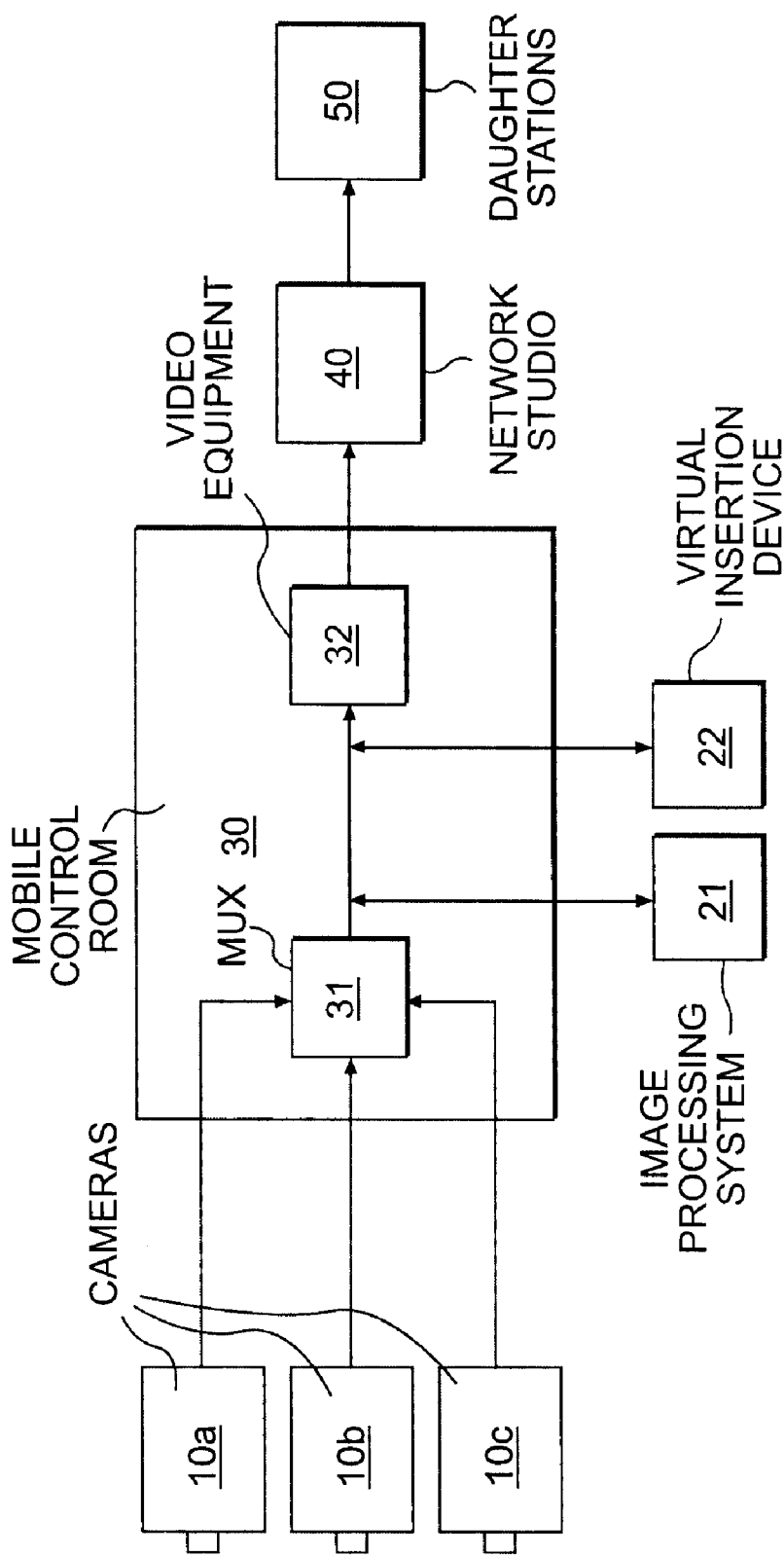
Figure 4:
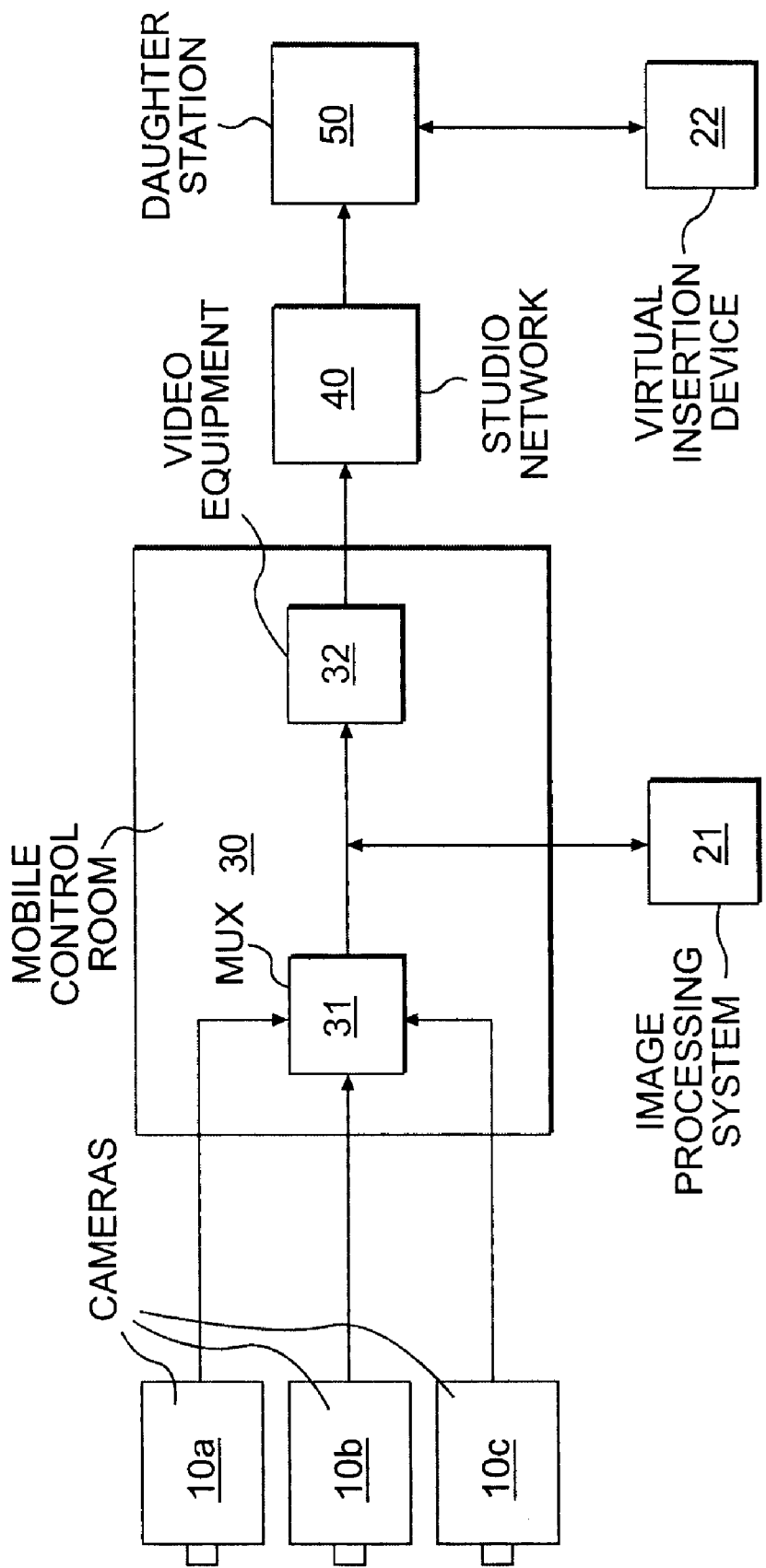
Figure 5:
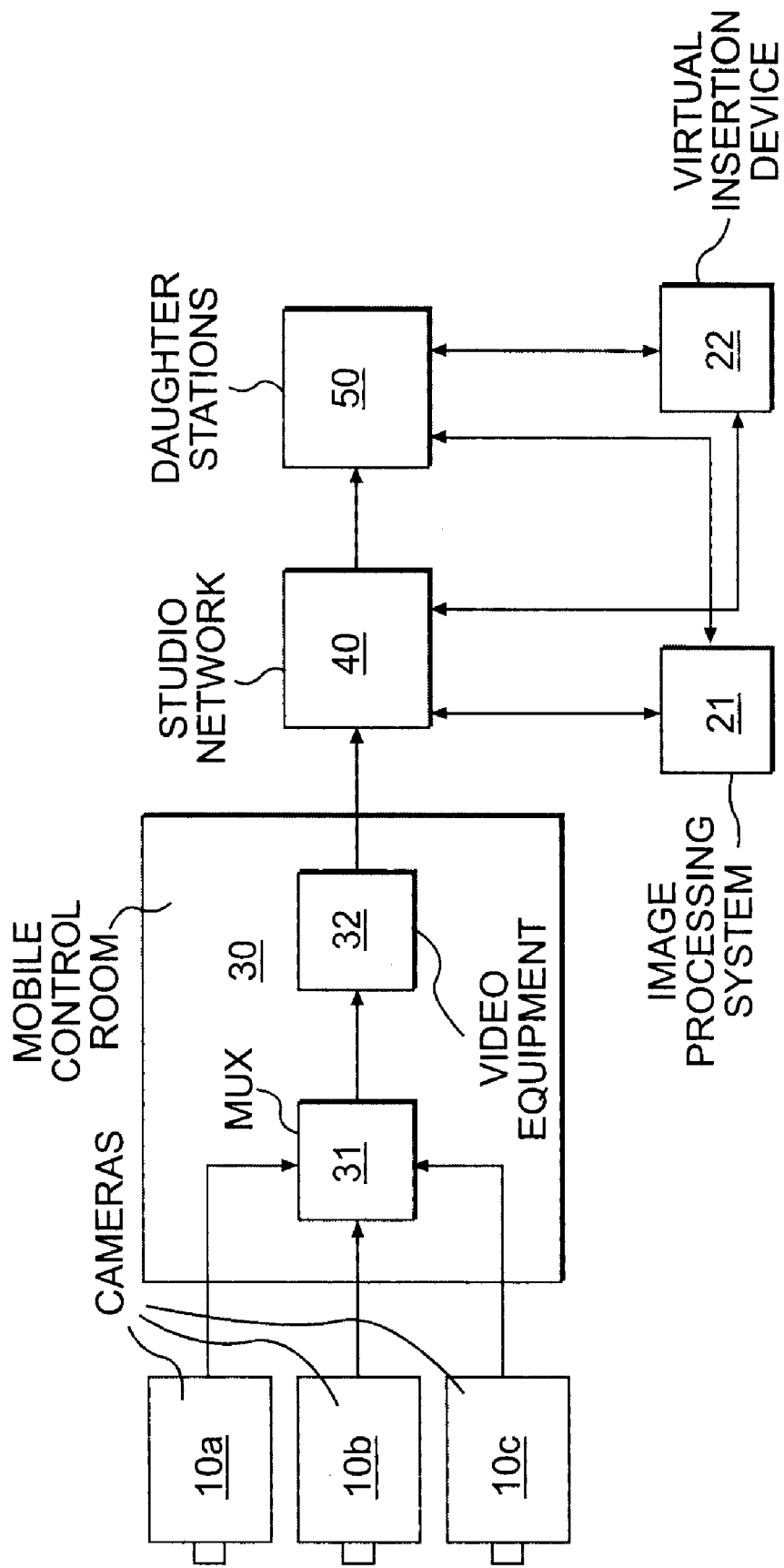
FIG. 5 is a block diagram representation of a virtual insertion system in accordance with the invention.

Referring to FIG. 5, which is a schematic block diagram similar to those of FIGS. 2 to 4 and in which like units are given the same reference numerals, the basic elements of the midlink system of the invention are shown. In brief, as discussed above, with the system of the invention, the data is collected at the originating site and transported to a network studio, or some other location, and processed there, off-site, in real time. In contrast to the uplink/downlink configuration of FIG. 4, all of the processing necessary for the virtual insertion process is done downstream of the originating site.

In FIG. 5, cameras 10a, 10b, 10c can be instrumented or uninstrumented as explained above. The video signals are sent to a mobile control room 30 which is located on-site. The control room 30 includes a multiplexer 31 used to choose which camera images are to be broadcast and conventional video processing equipment 32 used to add special effects and/or graphics to the camera images.

Once the signal processing is completed, several signals, described below, are transmitted from the mobile control room 30 to the remote location at which the virtual insertion unit 21 is located. In the exemplary embodiment illustrated, these signals are transmitted to the network studio 40 and thence to the virtual insertion unit 22 (although the virtual insertion unit 22 can, of course, be located at the network studio). One of the transmitted signals contains information with regard to the special effects applied to the image while each of the other signals corresponds to a single layer of graphics. If the active camera is not instrumented, the parameters of the target region, i.e., the area in which the advertising is to be replaced, are obtained using a pattern recognition module of the image processing unit 21. On the other hand, if the active camera is instrumented, the data for the sensor(s) (not shown) of the camera are also transmitted to the virtual insertion unit 22. The substitution of the stored graphic pattern (e.g. advertisement) for the relevant part or target region of the video image is carried out directly by virtual insertion unit 22.

As indicated above, any one of several different configurations of the system of the invention can be employed. For example, the virtual insertion operation can be applied to the signal traversing the network control node (network studio) 40 and the resultant signal then sent to the daughter station(s) 50. This operation can also be carried out at the daughter station(s) 50 as indicated in FIG. 5. Further, a composite of these two methods can be used wherein, as indicated in FIG. 5, image processing is performed on the signal received by the network studio 40 and the virtual insertion process carried out at the daughter station(s). It will be understood that multiple, different, insertions are possible at each of the daughter stations, as in the uplink/downlink system of FIG. 4.

An important aspect of the present invention is that the processed images are those from a "dirty feed," i.e., a feed containing all of the graphic layers and special effects. It is noted that with multiple camera systems, the delay associated with switching between cameras, and, in particular the lack of accuracy of the tally closure delay, two tallys could close at the same time. As indicated above, the tallys or closure signals indicate which camera is on air. In the case where two tallys close at the same time, the position of the target, i.e., the location of the advertising to be inserted, could be incorrectly detected. The system of the present invention determines which camera is on-air or active using logic, i.e., a simple algorithm wherein when, e.g., camera A has been on previously, and a tally signals are received indicating that both cameras A and B are on, it is assumed that later in time camera, camera B, is on. This simple algorithm can be implemented in hardware or software and overcomes the problems associated with the tally signal processing provided by many mobile control rooms or vans wherein the closure signal does not drop out immediately and thereby produces the ambiguity discussed above as to which camera is actually on air or active.

The present invention provides all of the advantages of the uplink/downlink system of FIG. 4 but, as stated, provides off-site video stream processing downstream of the mobile control room or van. The capability of processing the video stream off-site is afforded by the provision of the digital, as opposed to analog, transmission of the signal. This digital transmission guarantees the quality of the video stream, in contrast to an analog transmission which degrades with every satellite hop. By using the dirty feed, the images are processed downstream of multiplexer or switcher 31 and by employing the simple logic discussed above, tally synchronism problems do not occur.

In general, in accordance with the preferred embodiment, the input video signal is processed when the following condition are met: the tally of a camera is closed; no special effect is on the air, and there is no graphic layer which could affect the process (i.e., a blue graphic when the system is using a blue panel for occlusion). In this embodiment, if these conditions are not met, no processing is done.

Figure 6:
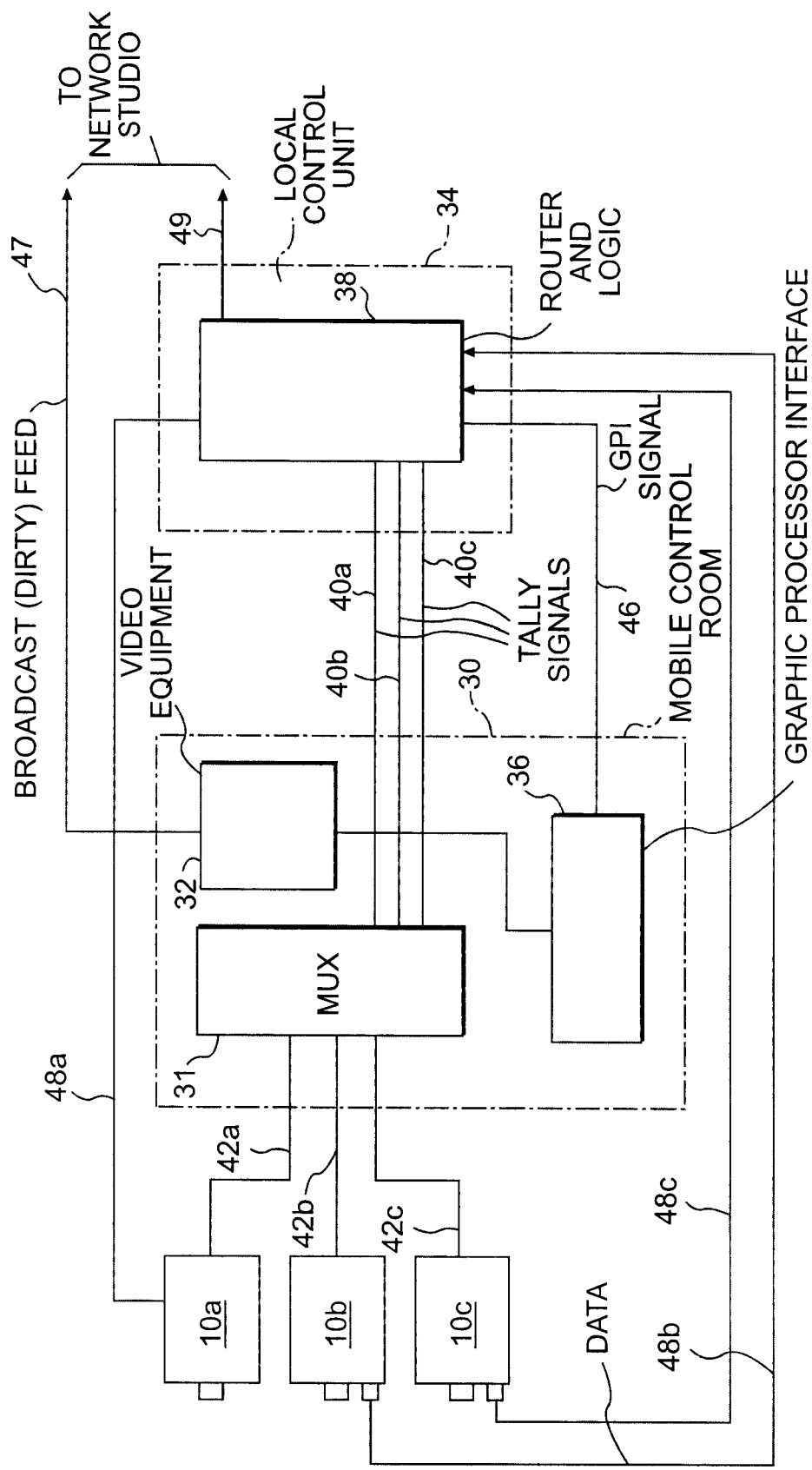
FIG. 6 is a block diagram showing in somewhat more detail the on-site portion of the system of FIG. 5 as implemented in accordance with a first preferred embodiment of the invention.

Referring to FIG. 6, further details of one preferred embodiment of the mid-link system are shown. In this embodiment, the cameras 10a, 10b and 10c are instrumented cameras as described above and have corresponding data lines 40a, 40b and 40c which are connected to a local control unit 34. The control unit 34 generally corresponds to the conventional "EPSIS™" unit or truck which is currently used by the present assignee, (and at which the virtual insertion process is normally carried out), but performs greatly simplified functions as will become apparent. Tri-axial cables 42a, 42b and 42c, which carry camera power and image signals, are connected from the respective cameras to the mobile control room or van 30. Although cables 42a, 42b and 42c can also be directly connected to local control unit 34 so as to provide a "clean clean" signal, this is not done in the preferred embodiment of the invention.

A conventional multiplexer or switcher 31 is connected to conventional video equipment 32 which, as discussed above, adds whatever graphics and special effects that are to be added. It is noted that to the extent that the term multiplexer denotes or implies automatic operation, unit 31 is perhaps more accurately referred to as a switcher or router in that, in general, the unit is selectively switched between camera outputs under the control of a director in the van.

The control room 30 also includes a graphic processor interface or GPI 36 which is connected to the video equipment 32 and which produces output signals based on the layers of graphics as well as special effects (e.g., slow motion) which have been added to the video image signal. These GPI signals are sent over a GPI line 46 to be input to the local control unit 34. In addition, tally signals for cameras 10a, 10b and 10c are sent to unit 34 over respective output lines 48a, 48b and 48c.

Figure 1:
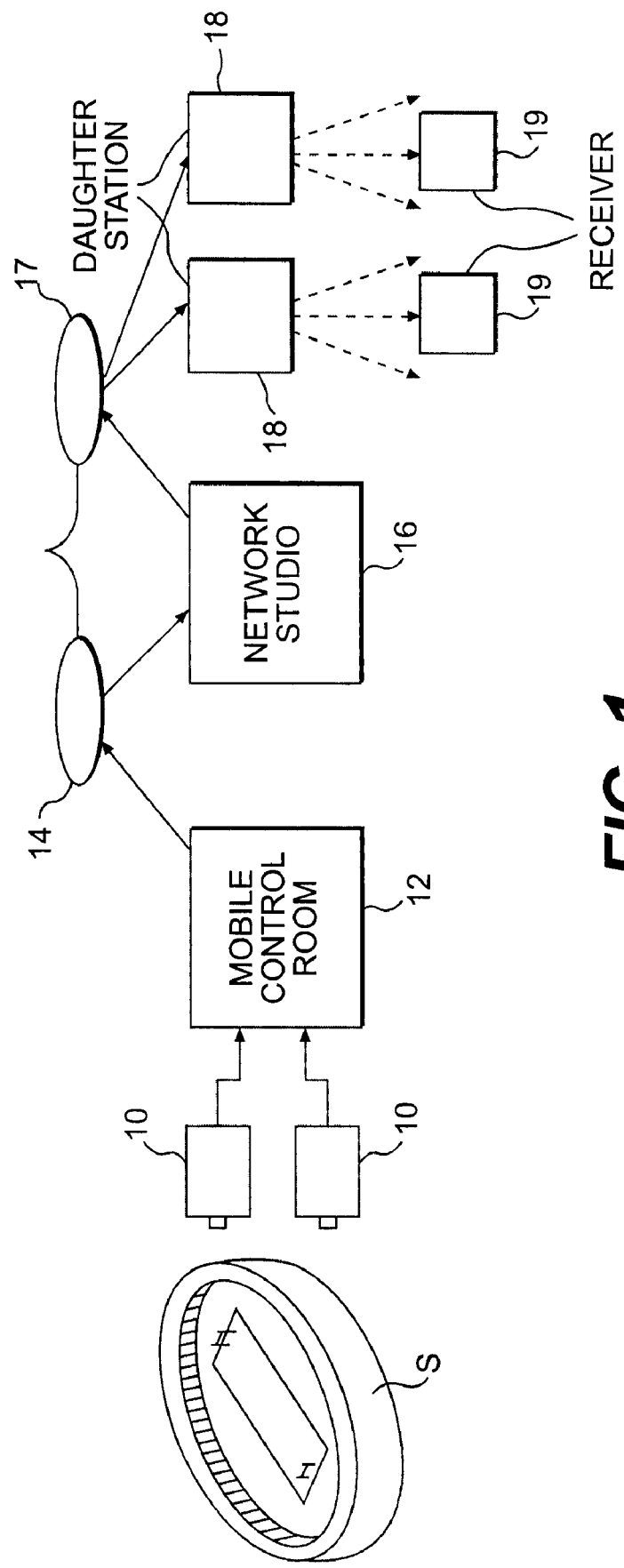
FIG. 1, which was described above, is a schematic block diagram of typical chain of distribution of a television program.

Multiplexer 31 in cooperation with video equipment 32 produces, on output line 47, a broadcast ("dirty feed") signal or feed, i.e., an edited signal which contains whatever layers of graphics and special effects that have been added to the video image signal and which is transmitted in digital form to the network studio 40. As noted elsewhere, if the control room or van 30 is adapted to produce an analog signal, conversion of the signal from analog to digital is performed. Although unit 40 is indicated to be a network studio, it would be understood that the broadcast feed can be sent to a production service studio or other type of control and then sent back to the network studio proper. Moreover, although a satellite link is illustrated in FIG. 1 it will be understood that other links or pathways, such as optical links, can be used.

In the exemplary embodiment under consideration, the key component of the local control unit 34 insofar as the present invention is concerned is the router (switcher) and logic unit 38. The basic function of local control unit 34 is to make a determination as to which camera is on-air or active based on the tally signals on lines 48a, 48b and 48c and to transmit this information along with the data (sensor) signals for the active camera and the graphic and special effects information from the GPI 36. As set forth, a simple algorithm is used to determine which camera is active and a simple logic circuit is included in router and logic unit 34 for this purpose. As was also discussed above, in accordance with a preferred embodiment, the input video signal, i.e., the broadcast signal, is processed when certain conditions are met, viz., the tally of the camera is closed, no special effect is on the air and there is no graphic layer which could affect the virtual insertion process. The tally signals enable the first determination to be made while the GPI signals enable the latter two determinations to be made. It is noted that decision not to process can be made at the GPI or at the local control unit 34 or even at a downstream location (e.g. at the network studio) based on the output of the switcher and logic unit 38 appearing at output line or port 49. In one embodiment, the decision to process is made at the GPI 36 which provides three different states, an "off" state wherein the GPI is turned off and two "on" states. In the "on" states, the GPI makes the determination discussed above with respect to whether the graphics or special effects are inconsistent with the processing to be done and in a first "on" state produces a "yes" or "process" signal and in the other "on" state produces a "no" or "do not process" signal. The data signals are, of course, used in determining the target area to be replaced in the virtual insertion process.

Figure 7:
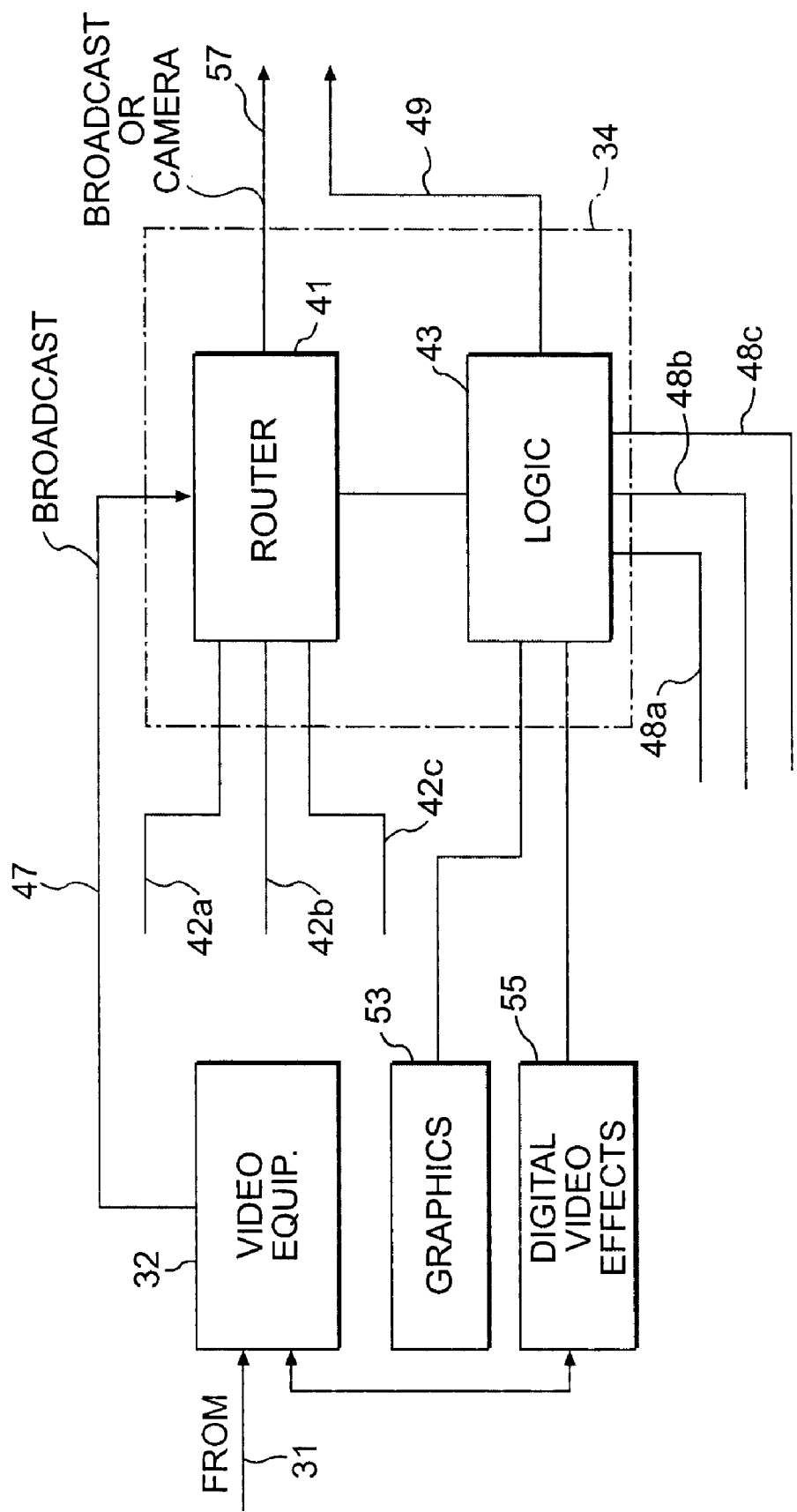
FIG. 7 is a block diagram of a part of the on-site portion of FIG. 6 as implemented in accordance with an alternative, preferred embodiment of the invention.

In an alternative, preferred embodiment shown in FIG. 7, wherein a router or switcher 41 and a logic control unit 43 are indicated as separate elements for purposes of clarity, the broadcast signal on line 47 is sent to the router 41 of local control unit 34 and along with the camera signals, i.e., video images, on triaxial cables 42*a*, 42*b*, and 42*c* associated with the individual cameras 10*a*, 10*b* and 10*c*, respectively. As discussed above, the router 41 is used, during the calibration of the system, to switch between the individual cameras 10*a*, 10*b* and 10*c* and the broadcast or program feed. The output line or cable 51 is used to selectively send one of camera images or the program signal or feed to the remote location (e.g. studio 40) for processing, and a separate channel is not used for the broadcast (program) signal as in FIG. 6. This remote routing of camera images assists in calibrating the system and, in this regard, enables the chroma key to be preset. It will be understood that during calibration each camera is ranged between its extreme values for each of its operating parameters and corresponding values generated so that, for example, the camera is panned over the full range of movement thereof between its end limits, linear values are assigned the camera positions throughout the pan range and corresponding time coded signals are generated. In addition, for instrumented cameras, a preliminary calibration is performed with respect to a "snapshot" or still camera image to define or determine the target region or regions of interest. After this initial calibration step, the data signals are sent to the remote then used in the virtual insertion process as described above. The router 41 is used during program broadcasting, i.e., only the broadcast signal 3 is sent at this time.

In the preferred embodiment of FIG. 7, signals with respect to the layers of graphics and the special effects, i.e., digital video effects (e.g., fade, dissolve, slow motion, etc.) are input separately to logic control unit 43 as indicated by the separate graphics unit 53 and digital video effects (DVE) unit 55. The signal from the latter is employed as tally closure signal, i.e., a dedicated one of the tally closure pins is assigned to the DVE signal and when this pin is connected to ground, the logic unit 43 knows that the DVE is on. In contrast with the embodiment discussed above, the graphics signal is preferably a simple two state (on-off) signal.

One very important advantage of the invention is the cost savings that can be realized thereby as compared with present separate channel, commercial systems. These cost savings make the system more versatile and, in this regard, enable virtual insertion operations to be used in connection with lower rated programs (i.e., a boxing match as opposed to the Super Bowl). These savings include those costs associated with having personnel on-site (including transportation, lodging and other costs) that are not required with the system of the present invention because of the virtual insertion function is performed off-site.

Further, the local control unit can be highly simplified, so that the standard EPSIS™ mobile unit is not needed and associated costs such as those for air conditioning, power generation and a driver are saved.

It is noted that the invention is not limited, e.g., to replacing one "billboard" with another and that the information desired to be added on be on open or barren surfaces unoccupied by elements of interest, e.g., such as on water, sand or open ground, and the like and that this information can include information about the event (e.g., for a swimming event), the names of the swimmers and the countries that the swimmers are representing can be superimposed on the swimming lanes.

Although the invention has been described above in relation to preferred embodiments thereof, it will be understood by those skilled in the art that variations and modifications can be effected in these preferred embodiments without departing from the scope and spirit of the invention.

What is claimed is:

1. A television system wherein a target region in successive video images is replaced by a matching representation pattern adapted to be inserted into said target region, said system comprising:

at least one television camera for producing a sequence of video images of a scene;

a mobile control room located on-site with said at least one camera and including broadcast image processing means for receiving said video images and for adding layers of graphics and special effects to said video images to produce corresponding video images and means for outputting the corresponding video images in digital form as a broadcast feed; and virtual insertion means, located off-site from said at least camera and said broadcast image processing means, for receiving said broadcast feed and for modifying said broadcast feed by replacing a target portion of the video images of the broadcast feed with a replacement pattern adapted to be inserted into the target portion and monitoring means for monitoring the graphics and special effects added to produce the video images of the broadcast feed and for producing an output indicating that a video image received by said virtual insertion means should not be modified thereby based on the nature of the graphics and special effects that have been added to the received video image.

2. A system according to claim 1 wherein said system includes a plurality of cameras which are adapted to be active, wherein said system further includes means for determining which one of said plurality of cameras is presently active and for producing a corresponding output, and wherein said virtual insertion means replaces a target portion of a video image of the broadcast feed from the active camera based on said output.

3. A system according to claim 2 further comprising router means housed separately from said mobile control room for, during calibration of the system, receiving said broadcast feed and individual direct feeds from each of said cameras and for selectively outputting one of said feeds.

4. A system according to claim 1, wherein said system includes a plurality of cameras, and further comprises means for generating camera closure signals for indicating which of said plurality of cameras is active, and means for monitoring said camera closure signals to determine if a camera closure signal has been received for the camera whose video image is currently being received by said virtual insertion means.

5. A system according to claim 1 wherein said monitoring means produces said output when any of the added graphics and special effects is incompatible with the replacement pattern.

6. A system according to claim 1 wherein said monitoring means produces said output when any special effect has been added to the received image to be processed.

7. A system according to claim 1 wherein said monitoring means produces said output when any layer of the added graphics is inconsistent with the replacement pattern.

8. A system according to claim 1, wherein said at least one camera comprises a plurality of instrumented cameras each including sensor means associated therewith for producing operational data with respect to corresponding camera, and said system further comprises means for sending said operational data to said virtual insertion means for use in replacing the target portion of a video image of the broadcast feed with a replacement pattern consistent with said operational data.

9. A system according to claim 8 wherein said operational data includes camera pan, tilt, focus and zoom.

10. A television system wherein a target region in successive video images is replaced by a matching representation pattern adapted to be inserted into said target region, said system comprising:
    a plurality of television cameras for, when active, producing a sequence of video images of a scene;
    sensor means for each of said cameras for sensing a plurality of operational parameters associated with the corresponding camera and for producing a respective data output;
    a mobile control room located on-site with said cameras and including broadcast image processing means for receiving said video images and for adding layers of graphics and special effects to said video images to produce corresponding video images, and means for outputting the corresponding video images in digital form as a broadcast feed; local control means located on-site with said mobile control room for receiving the data outputs of said sensor means and for outputting a data signal; and
    virtual insertion means, located off-site from said cameras and said local control means, for receiving said broadcast feed and said data signal and for modifying said broadcast feed by replacing a target portion of the video images of the broadcast feed with a replacement pattern adapted to be inserted into the target portion,
    said local control means further comprising logic control means for monitoring the graphics and special effects added to produce the video images of the broadcast feed and for producing an output indicating that a video image of the broadcast feed received by said virtual insertion means should not be modified thereby based on the nature of the graphics and special effects that have been added to the received video image.

11. A system according to claim 10 wherein said local control means further comprises means for determining which one of said plurality of cameras is presently active and for producing a corresponding output and wherein said virtual insertion means receives a control signal based on that output and, responsive thereto, replaces the target portion of a video image of the broadcasting feed from the camera indicated to be active.

12. A system according to claim 10 wherein said local control means further comprises router means for, during calibration of the system, receiving said broadcast feed and individual direct feed from each of said plurality of cameras and for selectively outputting one of said feeds.

13. A system according to claim 10 wherein said mobile control room includes means for generating camera closure signals for indicating which of said plurality of cameras is active and said local control means includes logic control means for monitoring said camera closure signals to determine if a camera closure signal has been received for the camera whose video image is currently being received by said virtual insertion means and for sending a corresponding signal to said virtual insertion means.

14. A system according to claim 13 wherein said logic control means produces an output indicating that the second in time of two cameras is active when closure signals for a first in time camera and the second in time camera are received at the same time.

15. A system according to claim 10 wherein said logic control means produces said output when any one of the added graphics or the special effect is incompatible with the replacement pattern.

16. A system according to claim 10 wherein said control logic means produces said output when any special effect has been added to the received image to be processed.

17. A system according to claim 10 wherein said control logic means produces said output when any layer of the added graphics is incompatible with the replacement pattern.

18. A television system wherein a target region in successive video images is replaced by a matching representation pattern adapted to be inserted into said target region, said system comprising:
    a plurality of television cameras for, when active, producing a sequence of video images of a scene;
    sensor means for each of said cameras for sensing a plurality of operational parameters associated with the corresponding camera and for producing a respective data output;
    a mobile control room located on-site with said cameras and including broadcast image processing means for receiving said video images and for adding layers of graphics and special effects to said video images to produce corresponding video images, and means for outputting the corresponding video images in digital form as a broadcast feed;
    local control means located on-site with said mobile control room for receiving the data outputs of said sensor means and for outputting a data signal; and
    virtual insertion means, located off-site from said cameras and said local control means, for receiving said broadcast feed and said data signal and for modifying said broadcast feed by replacing a target portion of the video images of the broadcast feed with a replacement pattern adapted to be inserted into the target portion,
    said mobile control room further including means for generating camera closure signals for indicating which of said plurality of cameras is active and said local control means including logic control means for monitoring said camera closure signals to determine if a camera closure signal has been received for the camera whose video image is currently being received by said virtual insertion means and for sending a corresponding signal to said virtual insertion means, and
    said logic control means producing an output indicating that the second in time of two cameras is active when closure signals for a first in time camera and the second in time camera are received at the same time.

* * * * *